Figure 1:
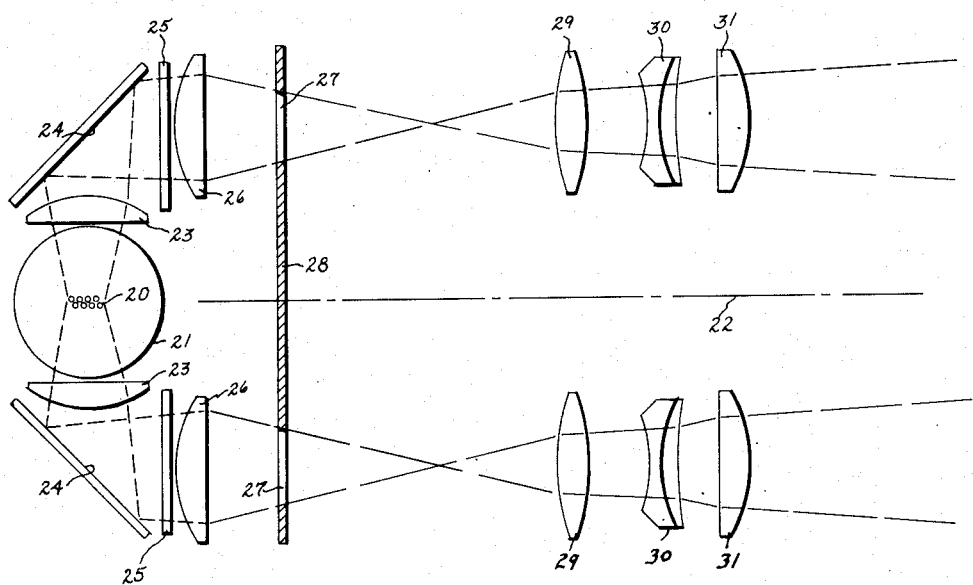

Oct. 10, 1950        W. B. GRUBER        2,525,598

OPTICAL PROJECTION SYSTEM IN A STEREOSCOPIC PROJECTOR

Filed June 30, 1947        2 Sheets-Sheet 1

INVENTOR.
Wilhelm B. Gruber
BY
Attorney

Oct. 10, 1950  W. B. GRUBER  2,525,598
OPTICAL PROJECTION SYSTEM IN A STEREOSCOPIC PROJECTOR

Filed June 30, 1947  2 Sheets-Sheet 2

INVENTOR.
Wilhelm B. Gruber
BY
Attorney

Patented Oct. 10, 1950

2,525,598

UNITED STATES PATENT OFFICE 2,525,598

OPTICAL PROJECTION SYSTEM IN A STEREOSCOPIC PROJECTOR

Wilhelm Beller Gruber, Portland, Oreg., assignor to Western Photo Supply Co., Portland, Oreg., a corporation of Oregon Application June 30, 1947, Serial No. 758,140

1 Claim. (Cl. 88—26)

My present invention relates to stereoscopic projectors, having particular reference to an optical system utilized in such a projector. In this regard it is to be appreciated that the invention comprises the arrangement of certain lenses or lens assemblies and other parts, rather than specific details of means to mount lenses or the like in a projector.

The principal object of the present invention is to provide means whereby a matched pair of stereoscopic transparencies are projected onto a single screen, the images being of equal size and light intensity so that when viewed in the proper manner the effects upon the retinas of the eyes of an observer are equal in intensity and all other characteristics so that the stereoscopic views may be resolved by the brain of the observer into a single view having depth as well as height and breadth. Stereoscopic picture taking and the projection of stereoscopic views onto a screen are known, definite sciences. The projection of the views may involve the use of polarized filters so that the waves of light carrying each image of a pair vibrate in nonparallel planes. In this case the observer uses polarized spectacle lenses so as to resolve the superimposed images from the screen into separate images receivable by the individual eyes, thus causing the brain to record the projections on the screen as the object was viewed by the observer who took the stereoscopic pictures. It is not my intention to claim the resolution of a matched pair of pictures into polarized planes since that is a known science. It is my intention to claim the optical system whereby superimposed, polarized images of equal size, light intensity and all other characteristics, are created upon a screen.

The principal object of the present invention is to provide a stereoscopic projector including matched pairs of lenses whereby matched images are produced, in which a single source of light is utilized to create such a matched pair of images.

In my system the beams created by the collector lenses are directed into substantial parallelism by mirrors placed at 45° to the optical axes of the collector lenses and projected into a matched pair of condenser lenses which converge the beams upon the films to be projected. The optical system in my invention could therefore be properly called a right angle condenser system, in other words, a system including a condenser lens assembly within which the beam of light is rotated at a convenient angle, in this case the angle being 90°. Whether the beam is uniform, convergent or divergent after leaving the collector lens is immaterial and all such examples come within the scope of my invention.

The single light bulb system offers many outstanding features and advantages. For example, in a two-bulb stereoscopic projector it is invariably difficult to match two new projection bulbs for light intensity (and it is imperative that uniformity of beams be achieved), and it is even more difficult to keep the output of two bulbs uniform after continued use since one bulb will invariably deteriorate faster than the other. It is then necessary to replace both bulbs with new ones as soon as one bulb loses some of its luminosity. In my system the stereoscopic beams are always perfectly matched during the entire life span of the single bulb.

Even if two identical bulbs are selected it is extremely difficult to obtain matched beams on account of the extreme sensitivity of the optical reflectors in a two-bulb system. If, for instance, the filaments of one bulb are spaced slightly differently (which they almost always are) the back reflectors would have to be matched in effect by tedious regulations so that the images of the filaments are projected equally between the filaments of the bulb.

An object of my invention is to provide a stereoscopic projector capable of producing matched images by the use of a single commercially available bulb.

A further object of the present invention is to provide a stereoscopic projector in which only one lamp base is used and in which curved optical reflectors are eliminated, this construction resulting in decreased initial cost by the elimination of a two-bulb base, additional wiring, additional space and curved optical reflectors.

A further object of my present invention is to provide a stereoscopic projector of compact size and light weight.

A further object of my invention is to provide a projector in which the heat produced is materially less than that of previously known projectors of equal effect, thus reducing the size and elaborateness of the cooling ssytem necessary to carry away excess heat.

The objects and advantages of the present invention will be more readily apparent from an inspection of the accompanying drawings taken in connection with the following specification wherein like numerals refer to like parts throughout.

Figure 2:
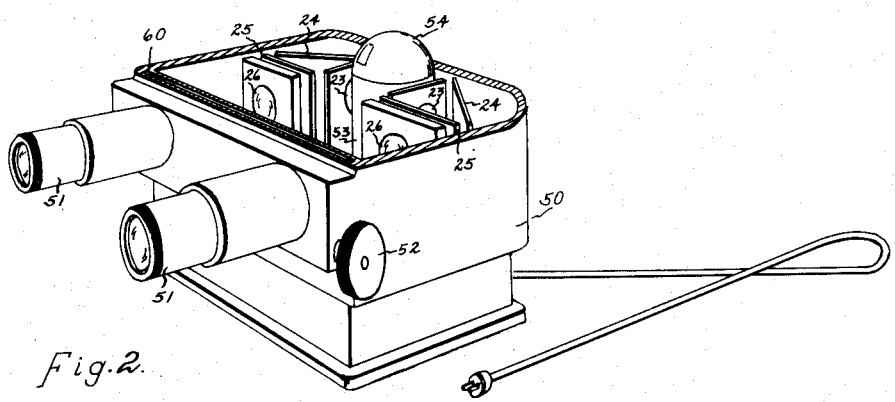

In the drawings Fig. 1 is a schematic representation of one form of my invention; and Fig. 2 is a view in perspective of a projector embodying my present invention, with portions of the projector being broken away.

Referring to Fig. 1, there is disclosed a source of light comprising a bank of filaments 20 inclosed in an evacuated glass bulb 21. The bank of filaments 20 could be more or less in number than that shown, or could be a single filament, without departing from my invention, all such groupings of filaments being defined as a single light source. In the utilization of a bulb comprising a bank of filaments, as illustrated, it is to be appreciated that I prefer locating the bulb so that the median plane of the filament bank lies along the median plane of the projector (hereafter referred to as the axis of projection), which is indicated in Fig. 1 by the numeral 22.

At each side of the light source there is placed a condenser lens assembly, the assembly at one side being matched with the assembly at the other side so as to produce a pair of matched beams of light, each projecting an equal image of the adjacent surface of the light source. Each condenser lens assembly comprises a collector lens 23 which is placed as close to the light source as practicable and centered along an optical axis extending normal to the axis of projection. This lens performs the phenomena of collecting the rays of light which fall within its scope and transforming this light into a directed beam. The beam emerging from the collector lens is turned through an angle of 90° by a deflecting surface 24 lying in a plane at 45° to the optical axis of the lens 23, the reflectors being located at 90° to each other and facing forwardly so as to create forwardly directed beams whose optical axes are parallel to each other and equidistantly spaced from the axis of projection 22. These beams are passed through second positive lenses 26 centered in the optical axes established by the collector lenses and mirrors. These lenses are properly termed condenser lenses. The lenses 23 and 26, together with the mirrors 24 thus comprise condenser lens assemblies within which the light rays from opposite sides of the filament are turned into substantial parallelism.

The function of the condenser lenses 26 is to condense or converge the beam produced by the light source. In the stereoscopic projector the projected beam is caused to pass through matched stereoscopic transparencies indicated at 27 which are mounted within a holder or plate 28, the plate being so arranged as to cause the concentrated beams to be saturated with the transparency pictures so that they may be projected upon a screen.

In Fig. 1 I have illustrated a preferred form of the present invention wherein the beams are passed through polarizing filters 25 of equal translucency arranged in a common plane normal to line 22 and oriented at variance to each other. The beams are then passed through matched condensing lenses 26 and through the transparencies 27 held in proper position by the mounting plate 28. The light emanating from the transparencies, saturated with the images thereof, is then passed through projector lens assemblies comprising the lenses 29, 30 and 31, the particular lenses herein illustrated being exemplary only as other combinations of lenses may form projection assemblies as is well known in the art. The principal requirement of the projector lens assemblies is that they be in optical registration with the condenser lens assemblies so as to project a magnified image of the transparency upon a screen.

In Fig. 2 I have illustrated an embodiment of my invention comprising a projector casing 50 from which extend projector lens assemblies 51, the relationship of elements of the lens assemblies being adjustable in any well known fashion. For example, the projector lenses assemblies may comprise lens such as lenses 29, 30 and 31 whose relationship may be varied by turning an adjusting knob 52. Monuted equidistantly between the axes of the projector lenses is a source of light comprising a bulb 53 having a light shield 5 thereon so as to shield the bulb in an upward direction. Suitable other shields (not herein illustrated) may be employed but it is preferred to leave a substantial portion of the bulb exposed to the air stream drawn through the casing by the usual cooling system (not herein disclosed). The bulb is preferably provided with any type of socket fitting member so arranged as to locate the median plane of the filaments thereof in fixed position as illustrated in Fig. 1. Suitable stands are provided to mount the condenser lens assemblies comprising elements such as elements 23, 24, 25 and 26 of Fig. 1. It can be seen from inspection of Fig. 2 that a single base may be provided in which the condenser lens assemblies are held in matched optical relationship and caused to project condensed beams into the projector lens assemblies which are held in matched optical relationship. The forward portion of the casing 50 is preferably provided with transparency holding means such as the slot 60 in which a frame such as the frame 28 may be placed to position the transparencies 27 in the paths of the condensed beams.

The operation of the projector herein illustrated fulfills the objects and provides the advantages set forth in the statement of objects of the invention. In such a formation matched condenser lens assemblies create beams which are rotated 90° into substantial parallelism, and then concentrated. The beams are of equal intensity and other characteristics since they are created by the opposite surfaces of a single light source. The matched parallel beams are then saturated to the same extent by transparencies, the images thereof being projected in superimposed relationship, in equal intensity, size and all other characteristics, upon a single screen. Double lamp assemblies, curved optical reflectors, and related parts are eliminated. Constantly equal beams are created at all times regardless of the wear or loss of intensity of the light source, and any available bulb of the proper wattage may be utilized.

Having illustrated and described preferred embodiments of my inventon it should be apparent to those skilled in the art that further modifications in detail and arrangement are possible. All such modifications as come within the true spirit and scope of the appended claim are considered to be a part of my invention.

I claim:

A stereoscopic projector comprising a single electric light bulb including a plurality of incandescent filaments arranged in a planar bank with equal surfaces of equal light producing capacity at each side of a central plane, a matched pair of first, positive condenser lenses arranged with their optical axes coinciding with a line normal to the center of said bank of filaments, said first condenser lenses being closely adjacent the surface of said bulb at opposite sides thereof and equidistantly spaced from said central plane so as to produce matched coaxial beams of equal intensity projected in opposite directions, a pair of plane mirrors arranged with their reflecting surfaces at an angle of ninety degrees to each other and each at an angle of forty-five degrees to said central plane and equidistantly therefrom, each of said plane mirrors intercepting all of the beam from one of said first lenses whereby said mirrors produce matched, reflected beams of equal intensity whose axes extend in the same direction parallel to each other and equidistantly from and parallel to said central plane, a pair of polarizing filters of equal translucency arranged in a common plane normal to said central plane, said filters being oriented at variance to each other and each intercepting one of said reflected beams, a matched pair of second, positive condenser lenses arranged in a common plane normal to said central plane adjacent said filters, each one of said second lenses having its optical axis substantially coinciding with the axis of one of said reflected beams and each one intercepting all of a reflected beam, and means to hold a pair of transparencies in a common plane normal to said central plane beyond said second lenses in such relation that each one of said transparencies intercepts substantially all of one of the polarized beams from said second lenses.

WILHELM BELLER GRUBER.

REFERENCES CITED

The following references are of record in the file of this patent:

UNITED STATES PATENTS

| Number | Name | Date |
|---|---|---|
| 450,815 | McClintock | Apr. 21, 1891 |
| 1,313,857 | Dennington | Aug. 19, 1916 |
| 1,503,766 | Pictet et al. | Aug. 5, 1924 |
| 1,539,579 | Kucharski | Mar. 26, 1925 |
| 1,797,066 | Zimmer | Mar. 17, 1931 |